US011093557B2

United States Patent
Gao et al.

(10) Patent No.: US 11,093,557 B2
(45) Date of Patent: Aug. 17, 2021

(54) KEYWORD AND BUSINESS TAG EXTRACTION

(71) Applicant: Zoominfo Apollo LLC, Vancouver (CA)

(72) Inventors: Hua Gao, Sunnyvale, CA (US); Amit Rai, Danville, CA (US)

(73) Assignee: Zoominfo Apollo LLC, Vancouver, WA (US)

( * ) Notice: Subject to any disclaimer, the term of this patent is extended or adjusted under 35 U.S.C. 154(b) by 58 days.

(21) Appl. No.: 15/689,942

(22) Filed: Aug. 29, 2017

(65) Prior Publication Data

US 2018/0060437 A1 Mar. 1, 2018

Related U.S. Application Data

(60) Provisional application No. 62/380,908, filed on Aug. 29, 2016.

(51) Int. Cl.
| | |
|---|---|
| *G06F 16/00* | (2019.01) |
| *G06F 16/951* | (2019.01) |
| *G06N 3/08* | (2006.01) |
| *G06F 40/30* | (2020.01) |
| *G06F 16/30* | (2019.01) |
| *G06N 20/00* | (2019.01) |

(52) U.S. Cl.
CPC ............ *G06F 16/951* (2019.01); *G06F 40/30* (2020.01); *G06N 3/08* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,128,613 A | * | 10/2000 | Wong ................... | G06F 16/313 707/738 |
| 9,092,802 B1 | * | 7/2015 | Akella .................. | G06N 7/005 |
| 9,645,999 B1 | * | 5/2017 | Giulia .................... | G06F 16/35 |
| 2006/0129975 A1 | * | 6/2006 | Wille ...................... | G06N 5/00 717/108 |
| 2007/0143278 A1 | * | 6/2007 | Srivastava ............. | G06Q 30/02 |

(Continued)

OTHER PUBLICATIONS

Aytug Ona, Serdar Korukoglu, Hasan Bulut "Ensemble of keyword extraction methods and classifiers in text classification", Revised Mar. 22, 2016, Available online Mar. 29, 2016, https://www.sciencedirect.com/science/article/pii/S0957417416301464 (Year: 2016).*

*Primary Examiner* — Polina G Peach
(74) *Attorney, Agent, or Firm* — Lane Powell PC

(57) ABSTRACT

A system to extract relevant keywords or business tags that describe a company's business is provided. The keyword extraction system utilizes a smart crawler to identify and crawl product pages from a company's website. These pages serve to provide textual descriptions of product offerings, solutions, or services that make up the company's business. The keyword extraction system combines these web documents with other textual descriptions of companies, e.g. from third party data vendors or other public data sources and company databases, to form a corpus of documents that describe companies. The corpus of documents and keywords are processed to segment the plurality of companies into subsets by applying a clustering technique and to provide visualization of the clusters with business tags.

20 Claims, 10 Drawing Sheets

(56) References Cited

U.S. PATENT DOCUMENTS

| | | | |
|---|---|---|---|
| 2007/0299743 A1* | 12/2007 | Staib | G06Q 10/107 705/7.33 |
| 2008/0086343 A1* | 4/2008 | Pendergraft | G06Q 30/02 705/7.29 |
| 2008/0086363 A1* | 4/2008 | Kass | G06Q 10/04 705/7.29 |
| 2008/0288889 A1* | 11/2008 | Hunt | G06Q 30/02 715/810 |
| 2010/0145678 A1* | 6/2010 | Csomai | G06F 40/268 704/9 |
| 2010/0262550 A1* | 10/2010 | Burritt | G06Q 30/02 705/319 |
| 2011/0093452 A1* | 4/2011 | Jain | G06F 16/951 707/723 |
| 2011/0125550 A1* | 5/2011 | Erhart | G10L 15/005 705/7.29 |
| 2011/0213655 A1* | 9/2011 | Henkin | G06Q 30/00 705/14.49 |
| 2012/0089497 A1* | 4/2012 | Taylor | G06Q 40/00 705/35 |
| 2012/0137367 A1* | 5/2012 | Dupont | G06F 21/00 726/25 |
| 2012/0203584 A1* | 8/2012 | Mishor | G06Q 30/02 705/7.11 |
| 2013/0031018 A1* | 1/2013 | Jellum | G06Q 10/0637 705/348 |
| 2013/0232159 A1* | 9/2013 | Daya | G06F 16/337 707/758 |
| 2016/0196328 A1* | 7/2016 | Achtermann | G06F 16/285 707/737 |
| 2016/0307233 A1* | 10/2016 | Pan | G06Q 50/01 |
| 2017/0109344 A1* | 4/2017 | Shmueli | G06F 16/355 |

\* cited by examiner

KEYWORD AND BUSINESS TAG EXTRACTION

CROSS-REFERENCE TO RELATED APPLICATIONS

This patent application is a non-provisional patent application based on U.S. provisional patent application Ser. No. 62/380,908 filed on 29 Aug. 2016, which is incorporated by reference herein.

FIELD

Implementations disclosed herein relate, in general, to information management technology and specifically to semantic analytics technology.

BACKGROUND

Marketing strategies commonly involve dividing a broad market of prospects into subsets or segments of prospects that have characteristics in common, in the hope that they will have common needs, interests, or priorities. In the case that prospects are individual human consumers, such characteristics can include, but are not limited to, demographic information about the age, sex, race, religion, occupation, income, or education level, geographic information about the prospect's location within regions, countries, states, cities, neighborhoods, or other locales, and behavioral and psychographic information about the lifestyle, attitude towards and response to certain products or other stimuli. In the case that prospects are companies, e.g. in business-to-business (B2B) marketing, such characteristics commonly include firmographic information, such as the company size, revenue, industry, and location. Marketers can apply strategies that are specialized for each segment, e.g. by creating messaging content or advertisements that resonate with, or are more relevant to the target prospect, which lead to much better conversion rates.

In the same vein, sales development teams and account executives achieve better outcomes if they research the prospect's background or characteristics and personalize their outreach efforts. As an example, in B2B situations, providing a case study or success story about a current customer similar to the prospect company is a powerful strategy to convince the prospect to purchase a product or service because it provides evidence of previous success and reduces the perceived risk by the prospect. The ability to semantically describe, group, and identify similar companies can be viewed as a form of business micro-segmentation that is much more specific than segmenting using broad industry labels to describe prospect companies, and is in turn more powerful and actionable.

SUMMARY

A system to extract relevant keywords or business tags that describe a company's business is provided. The keyword extraction system utilizes a smart crawler to identify and crawl product pages from a company's website. These pages serve to provide textual descriptions of product offerings, solutions, or services that make up the company's business. The keyword extraction system combines these web documents with other textual descriptions of companies, e.g. from third party data vendors or other public data sources and company databases, to form a corpus of documents that describe companies. The corpus of documents and keywords are processed to segment the plurality of companies into subsets by applying a clustering technique and to provide visualization of the clusters with business tags.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DESCRIPTION

Disclosed herein is an automated system and method to extract relevant keywords (i.e. business tags) that describe a company's business.

Figure 1:
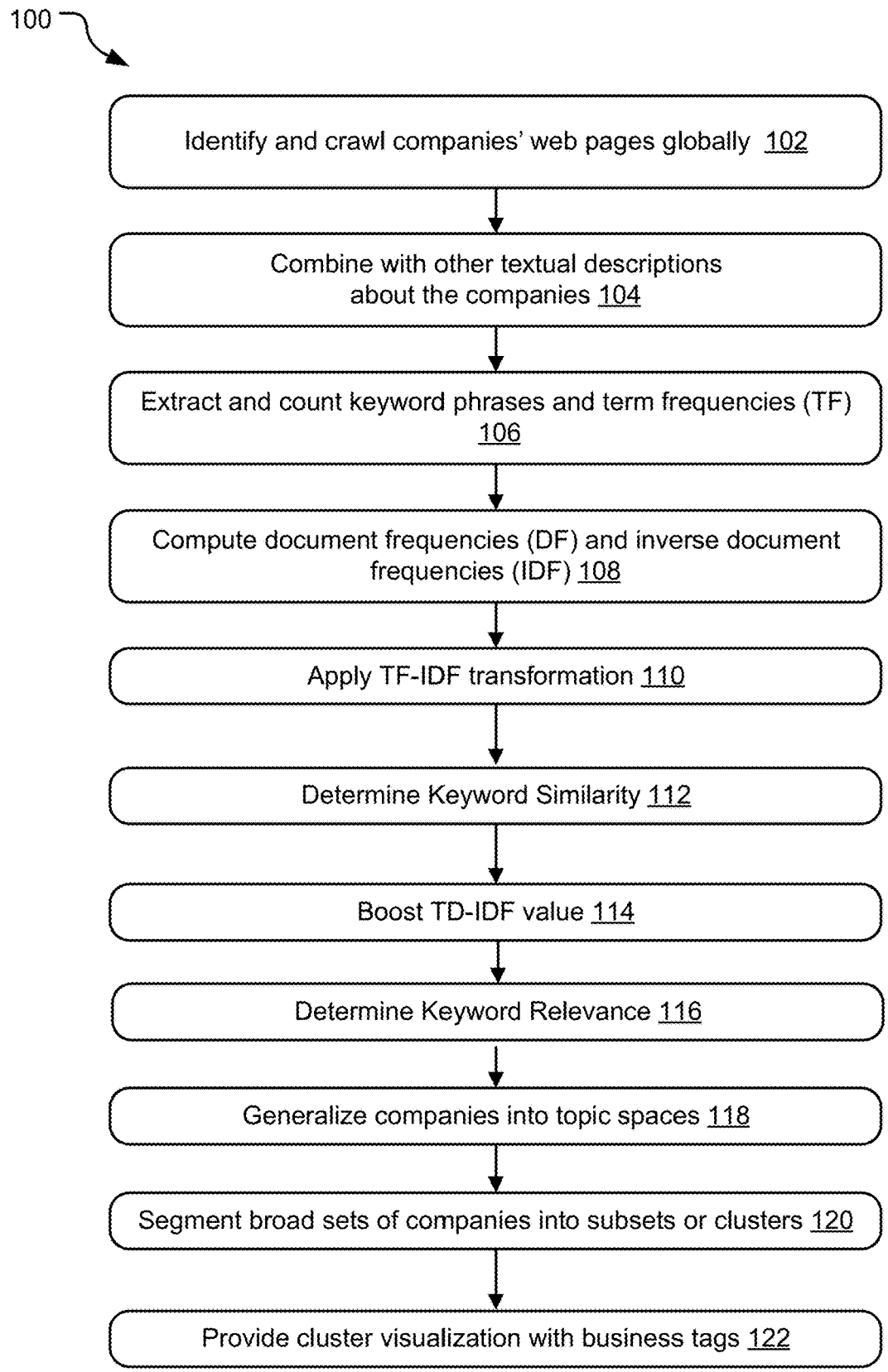
FIG. 1 discloses example operations of the predictive analytics technology disclosed herein.

FIG. 1 illustrates a series of operations used to extract business tags that describe a company's business. At an operation 102, the system disclosed herein uses a smart crawler to identify and crawl web pages from a number of companies' websites. For example, such companies may be all the companies that may use products or services from a client for which the system disclosed herein is performing keyword and business tag extraction. However, in an alternative implementation, the operation 102 crawls the websites of companies globally. Alternatively, the operation 102 only crawls product web pages of the companies' websites. Yet alternatively, the operation 102 may crawl websites of only selected target companies.

These pages of the companies' website serve to provide textual descriptions of product offerings, solutions, or services that make up the companies' business. For example, a web page of a target company that is in the business of selling footwear may provide information about what kind of footwear the target company is selling, the price point of the footwear, target market for the footwear, etc. The operation 102 identifies a number of keywords related to various companies. The operation 102 performs smart crawling in that it determines which pages are appropriate for crawling, which keywords are appropriate, etc. For example, the operation 102 may determine that it is important to crawl product page but it is not necessary to crawl a terms and conditions page. Similarly, the operation 102 may determine that it does not need to extract words such as "the," "best," etc., as they do not necessarily describe products and services of the company.

In one implementation, the operation 102 outputs a list of keywords extracted from the web pages for a company and the frequency of each of such keywords. For example, for a company selling footwear, the keywords may be "shoes," "sandals," "running," etc. The frequency at which each of these keywords is extracted from the web pages may also be tabulated. In one implementation, the operation 102 may output a matrix of a large number of companies and keywords for each of these companies.

Subsequently, an operation 104 combines these web documents with other textual descriptions of companies, e.g. from $3^{rd}$ party data vendors or other public data sources and company databases, to form a corpus of documents that describe companies. Thus, for example, the operation 104 may extract keywords from other source, such as a news article, a LinkedIn™ page, Wikipedia™ page about the company, a consumer product review website, AdWords purchased by the company, etc. Thus, in the example of a company selling footwear, the operation 104 may combine textual descriptions from such other sources—also referred to as the secondary sources. The output of the operation 104 is used to enhance the matrix generated at the operation 102.

Subsequently, an operation 106 extracts keyword phrases from the text descriptions and counts keyword phrases that appear for each company, forming a vector of term frequencies to represent each company, where a term is an n-gram, a chain of n words. Specifically, the operation 106 generates a list of candidate descriptive phrases that may provide description of a company. For example, for the company selling footwear, one such phrase may be "running shoe." Another such phrase may be "low-impact shoe," etc. The operation 106 extracts such keyword phrases for the company and documents the frequency of each of these keyword phrases. In one implementation, the candidate descriptive phrases are generated by aggregating the keywords from the company web pages and from the secondary sources, meta keywords and meta descriptors from the company web pages and from the secondary sources. The operation 106 aggregates these descriptive phrases and for the company and generates the count of those phrases.

The descriptive phrases are also referred to as n-grams. For example, for a company selling footwear a monogram may be "shoes," a bi-gram may be "running shoe," a tri-gram may be "altitude running shoe," etc. The operation 106 generates the count for each such n-grams related to the company. In one implementation, the operation 106 generates the n-grams across the websites of the companies globally to determine the n-grams that are used more often to describe a company or a product. Each of the n-grams in this collection of n-gram is related to a count of how often the n-gram occurs. In one implementation, an n-gram having a higher count is ranked higher.

An operation 108 computes document frequencies (DF) for each considered phrases or n-grams across the entire corpus, defined as the number of companies whose text descriptions contained that phrase. In one implementation, to compute the DF for each n-gram, a website is considered one document. Alternatively, each web page may be considered a document. Thus, if the n-gram "altitude running shoe" shows up on 300 web pages, including company pages, news sources, Wikipedia pages, etc., the n-gram "altitude running shoe" is given a document frequency of 300. In one implementation, the count may be evaluated as a percentage of the total documents in the universe. For example, if the system is evaluating a million documents, the document frequency of 300 may indicate the phrase "altitude running shoe" to be important and descriptive, while a word like "the" is deemed unimportant because it appears in nearly all million documents. In yet alternative implementation, each occurrence of an n-gram is given a weight based on the documents that the n-gram is from. For example, an n-gram appearing on a Wikipedia document may be given a higher weight compared to an n-gram appearing on a social network document.

To reduce the contribution of phrases that are very common, an operation 110 applies a term-frequency (TF)—inverse-document-frequency (IDF) (TF-IDF) transformation. Here the term-frequency (TF) emphasizes phrases that appear multiple times within the document, while the inverse document frequency (IDF) de-emphasizes phrases that are common across documents, and emphasizes phrases that are rarer, more descriptive, or salient. For example, if an n-gram "running shoe" appears 10 times in a document, it has the TF of 10 for the document. On the other hand, if the n-gram "running shoe" is common across all documents, it may be a very common n-gram and its inverse frequency across all documents (IDF) de-emphasizes the importance of that n-gram. Thus, the TF is a frequency per document and the IDF is inversely proportional to the frequency across the entire corpus of documents. The TF may be generated based on output from the operation 106 whereas the IDF may be calculated based on the output of the operation 108.

The term-frequency function is a function that increases with the number of occurrences of an n-gram phrase in a document. An example is simply TF=term_count, while in a sublinear scaling example, TF=1+log(term_count). The inverse-document-frequency function is a function that decreases with the number of documents that contain the n-gram phrase. An example formulation is IDF=log(num_total_documents/num_documents_with_term). The TF-IDF is the multiplicative product of TF and IDE While the TF-IDF transformation is good at scaling individual terms independently based on occurrences within a document and occurrences across the corpus, it does not always work well for keyword ranking; the terms with the highest TF-IDF values are often not the terms that a human would consider to be most relevant descriptors of the company. The underlying problem is that TF-IDF does not take into consideration the co-occurrence of different keyword phrases within each document. The patterns of co-occurring words and phrases can be interpreted as "topics" within a document, and each company or document can be expected to focus on a few topics or themes. A human typically identifies relevant keywords by considering both the saliency of the keyword itself, and whether the keyword is "on topic" within the context of the document. For each document, the operation 110 outputs a list of key n-grams and a TF-IDF value for that key n-gram.

An operation 112 determines similarity of keywords. Specifically, the operation 112 determines how similar any two keywords are to each other. The method for determining similarity of keywords is further disclosed below with respect to FIGS. 9 and 10.

Figure 3:
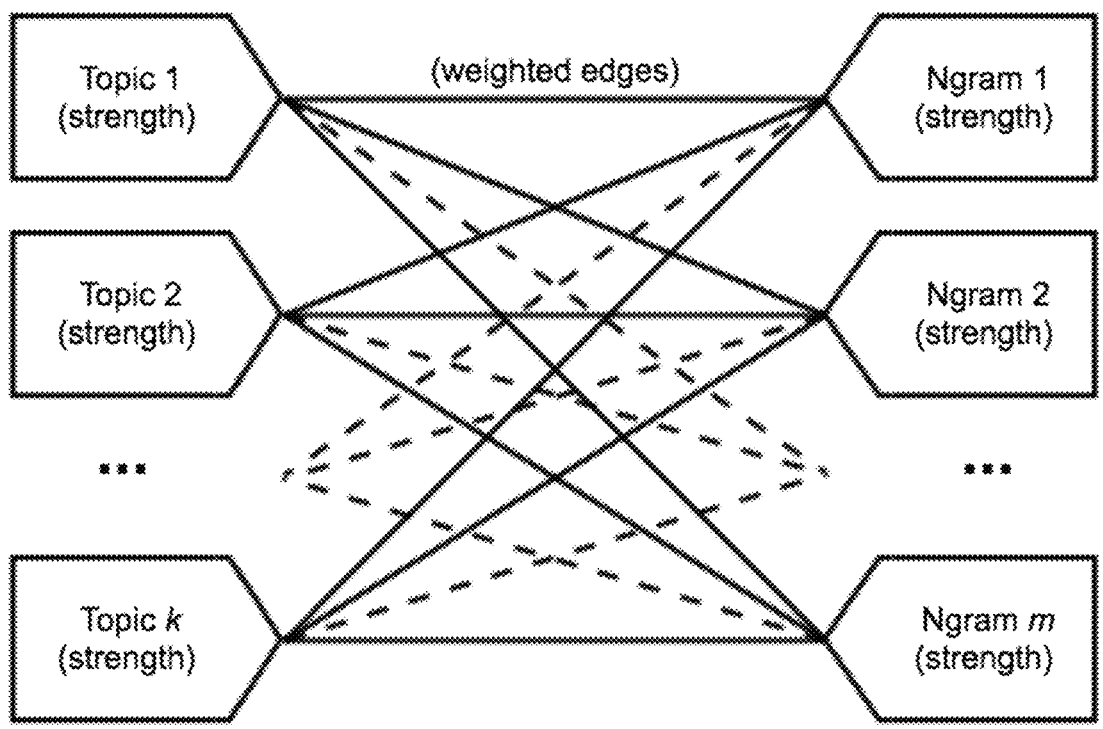

An operation 114 applies a relevance transform by boosting the TF-IDF value of phrases within each document based on how on-topic it is. One of the inputs for the operation 114 is the keyword similarity value generated at operation 112. A given document can be represented by n-grams and their corresponding strengths. Considering the co-occurrence of n-grams within the document, also allows extracting a set of topics, their strengths, and their associated influences to-and-from the individual n-grams. A generalized diagram of the n-gram and topic relationships is shown below in FIGS. 3 and 4. In an example implementation, the relevance scores for each n-gram can be calculated as the n-gram strength times the weighted sum of the associated topic strengths, i.e.

$$r_i = w_i \cdot \sum_{j=1}^{k} (e_{ji} \cdot t_j)$$

where $r_i$ is the relevance of n-gram i, $w_i$ is the strength of n-gram i, $e_{ji}$ is the influence or edge weight from topic j to n-gram i, $t_j$ is the strength of topic j, and k is the number of topics.

In one implementation, the topics can be selected to be the individual stemmed words that make up the n-grams. Stemming refers to the reduction of words to their word stem, base, or root form. For example, a bigram "mobile gaming" can be viewed as exhibiting two topics "mobile" and "game", the stemmed forms of "mobile" and "gaming". If there exist many other unique phrases that are comprised of words that stem to "mobile" and "game", such as "mobile applications" or "gaming equipment", then it would increase the topical strength of "mobile" and "game" within this document, and every phrase linked to these topics would get boosted in terms of relevance. One example function for assigning the topic strength is 1+log(degree) where degree is the number of edges from that topic to its associated n-grams within the document, or in other words, the number of unique n-grams that contain a word that stems to that topic. In this case, the edge weights can simply be 1.0 when there is an association between an n-gram and a topic, and 0.0 (no edge) when the n-gram does not contain a word that stems to the topic. A hypothetical example of this implementation, for a document about mobile gaming and game development is shown below in FIG. 4.

Figure 4:
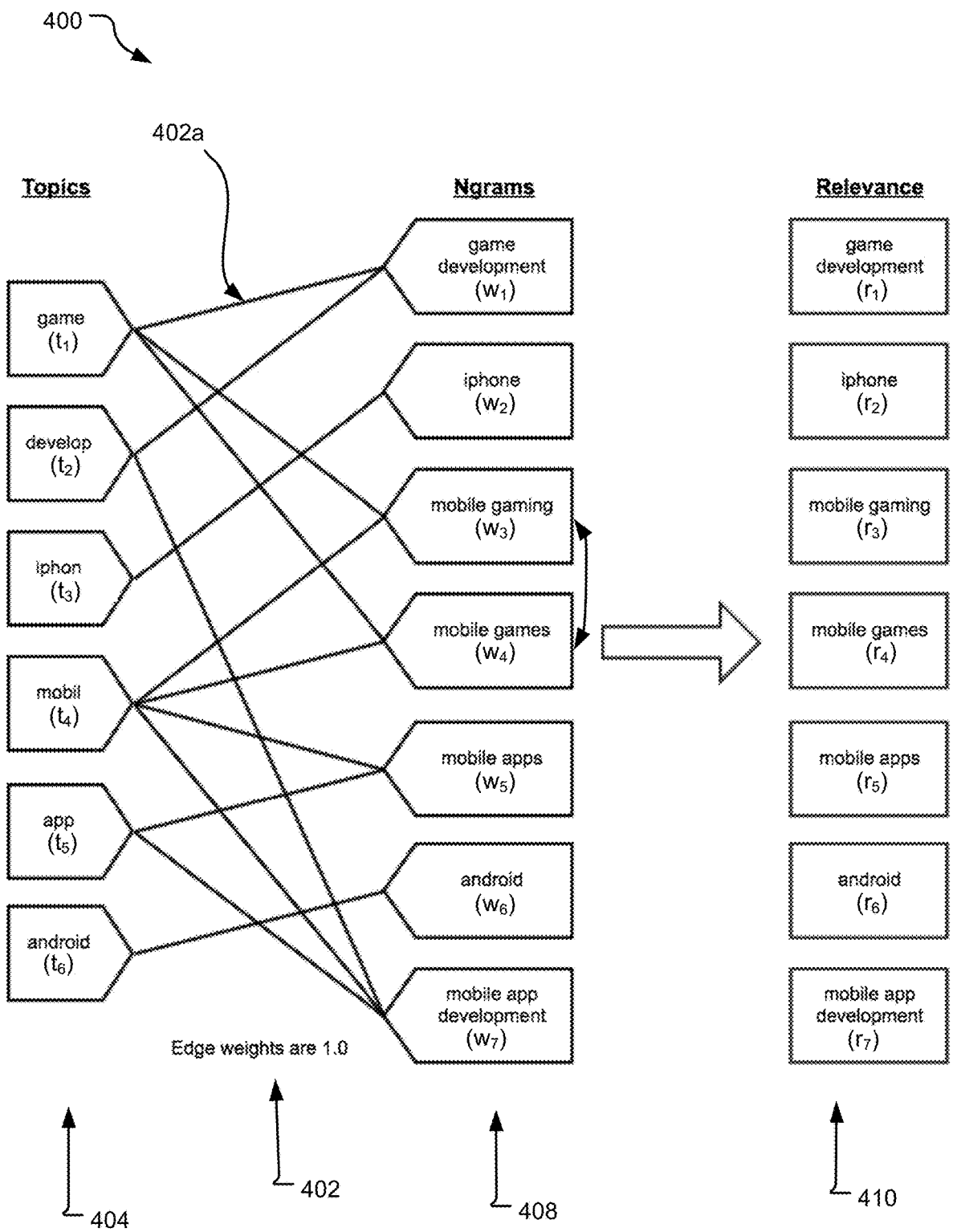
FIG. 4 illustrates an alternate example block diagram illustrating how topics that exist within a document are used to boost the relevance score of individual keywords that are related to that topic according to an implementation disclosed herein.

Similar Keywords and Phrases:

In FIG. 4, $t_i$ is the strength of topic i, $w_i$ is the n-gram tf-idf value, and $r_i$ is the output relevance score. For example, the topic "game" is shared between three n-grams ("game development," "mobile gaming," and "mobile games"). While in FIG. 4 the edge weights 402 between the topics 404 and the n-grams 408 are 1.0, in another implementation different edge weights 402 may be used. For example, an alternative algorithm may determine that in the n-gram "game development," the phrase "game" only contributes 40% of and therefore, the edge 402a may be given a weight of 0.40.

Furthermore, similarities between n-grams may also be used by a computer to determine the relevance scores. For example, the n-gram "mobile games" and "mobile gaming" may be determined to be similar, in which case, the co-occurrence of these two n-grams being similar to each other within one document can be used to boost the TF-IDF value of each of these two n-grams.

In other implementations, the topics, topic strengths, and n-gram-topic edge weights for each document can be extracted using techniques such as Latent Semantic Analysis, Latent Dirichlet Allocation, Hierarchical Dirichlet Processes, Non-negative Matrix Factorization, others, or a combination of methods. Similar to before, the topical strength can also be used to amplify the associated individual n-gram strengths to form a measure of relevance for each n-gram.

Figure 2:
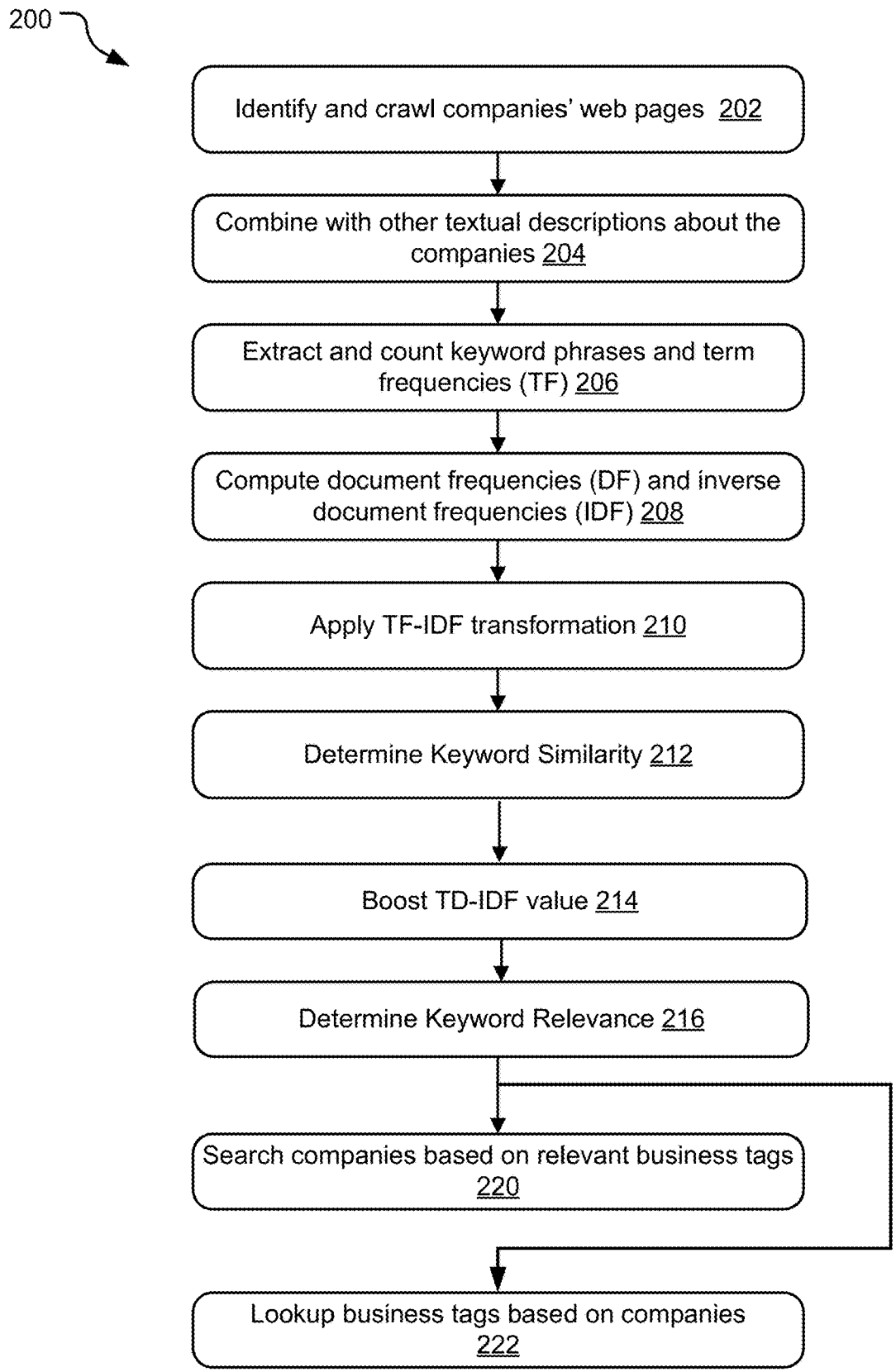
FIG. 2 discloses alternate example operations of the predictive analytics technology disclosed herein FIG. 3 discloses an example block diagram example block diagram illustrating how topics that exist within a document are used to boost the relevance score of individual keywords.

The top-ranking keyword phrases by relevance score can be used as business tags that succinctly describe a company's business or products. The dataset supports lookups by company to find the company's descriptive tags (as shown below in FIG. 2 by operation 222), and reverse lookups by business tag to retrieve all companies that specialize in that tag (as shown below in FIG. 2 by operation 220). Thus, FIG. 2 illustrates operations for providing keyword-to-company relations.

Keyword Relevance/Keyword to Company Search

In one implementation, an operation 116 generates relevance score for various companies and keywords/phrases. For example, the operation 116 may produce, for each company, a ranked and scored list of keywords. Thus, for a particular footwear company the keyword "boots" maybe ranked higher than the term "sandal," in which case, that particular company may be more likely to sell, specialize in, known for, etc., for boots compared to sandals. In one implementation, the operation 116 may determine such ranking based on the TF-IDF for the terms in the documents related to the company. For example, if the keyword "boots" appears in more documents for the particular footwear company compared to the keyword "sandals," "boots" is ranked higher than "sandals" for that particular footwear company.

Similarly, the operation 116 may also produce for each keyword, a ranked and scored list of companies. Thus, for example, for the keyword "boot" a First Footwear Company may be ranked higher than a Second Footwear Company, which may signify that the First Footwear Company is more likely to sell, specialize in, known for, etc., for boots compared to the Second Footwear Company. In one implementation, the operation 116 may determine such ranking based on the TF-IDF for the term in the documents related to the companies. For example, if term "boots" appears more often in documents related to the First Footwear Company compared to the documents related to the Second Footwear Company, the First Footwear Company is ranked higher than the Second Footwear Company for the keyword "boots." While the illustrated implementations of the operations 100 disclose the operation 114 for boosting the TF-IDF value and the operation 116 for determining keyword relevance, in alternative implementation, these operations may be combined.

Clustering and Cluster Tagging

The TF-IDF and Relevance based semantic representations of companies can be used to directly drive product applications as well as implicitly support downstream machine learning applications. In one machine learning application, Representation Learning techniques are applied by an operation 118 on the TF-IDF or relevance vectors to generalize or project companies in the high dimensional n-gram space into a lower dimensional topic space. Such techniques include using Singular Value Decomposition, Latent Dirichlet Allocation, Hierarchical Dirichlet Processes, Non-negative Matrix Factorization, Neural Network Autoencoders, and others. Companies that are close together in the topic space, e.g. according to Euclidean or Cosine distance, are effectively similar to each other in terms of their business, product offerings, solutions or services.

Given that similar companies are close together in the topic vector space, a clustering algorithm is also applied at an operation 120 to automatically segment a broad set of companies into subsets or groups of companies that are similar to each other. Such clustering techniques include, but are not limited to K-Means, Spectral Clustering, DBSCAN, OPTICS, Hierarchical Clustering, and Affinity Propagation.

Figure 7:
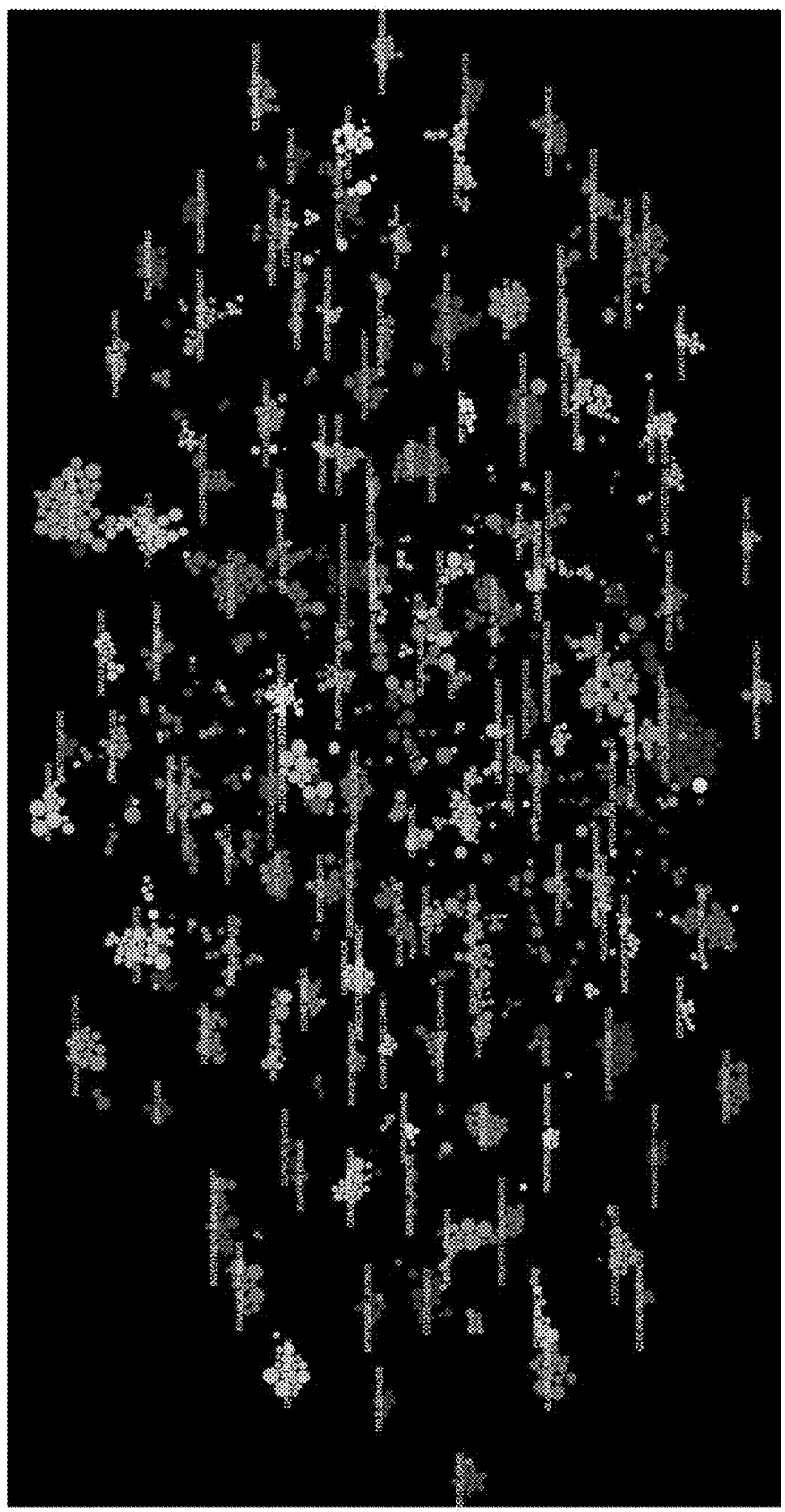
FIG. 7 illustrates example view of the clusters with various business tags.

A technique disclosed herein also allows to automatically extract relevant n-gram keywords to describe each cluster of companies. For a cluster or any set of companies, the constituent companies' n-gram vector representations are merged into one n-gram vector via an aggregating function, a simple example of which is just the vector sum. From this merged n-gram vector, the relevance scoring algorithm described earlier is applied to boost the strengths of relevant n-grams, following the same principle that n-grams that are on-topic within the cluster should be considered more relevant. The top n-grams by relevance can be used to tag each cluster so that they are readily human understandable. FIG. 7 below illustrates a detailed view of the clusters with various business tags, such as "Application Development," "Mobile Products," etc.

Visualization

Starting again from the notion that similar companies are close together in our semantic vector space, there is a lot of potential value in being able to visualize the clusters or segments of similar companies within a broad set of companies. The key requirement of the visualization technique is to be able to position entities that are close together in high dimensional space such that they are also close together in 2- or 3-dimensional space in order to preserve and visualize the similarity structure in an intuitive way. Some example techniques (sometimes referred to as manifold learning) that satisfy this requirement are t-Distributed Stochastic Neighbors Embedding (t-SNE) and Multi-Dimensional Scaling (MDS).

Figure 6:
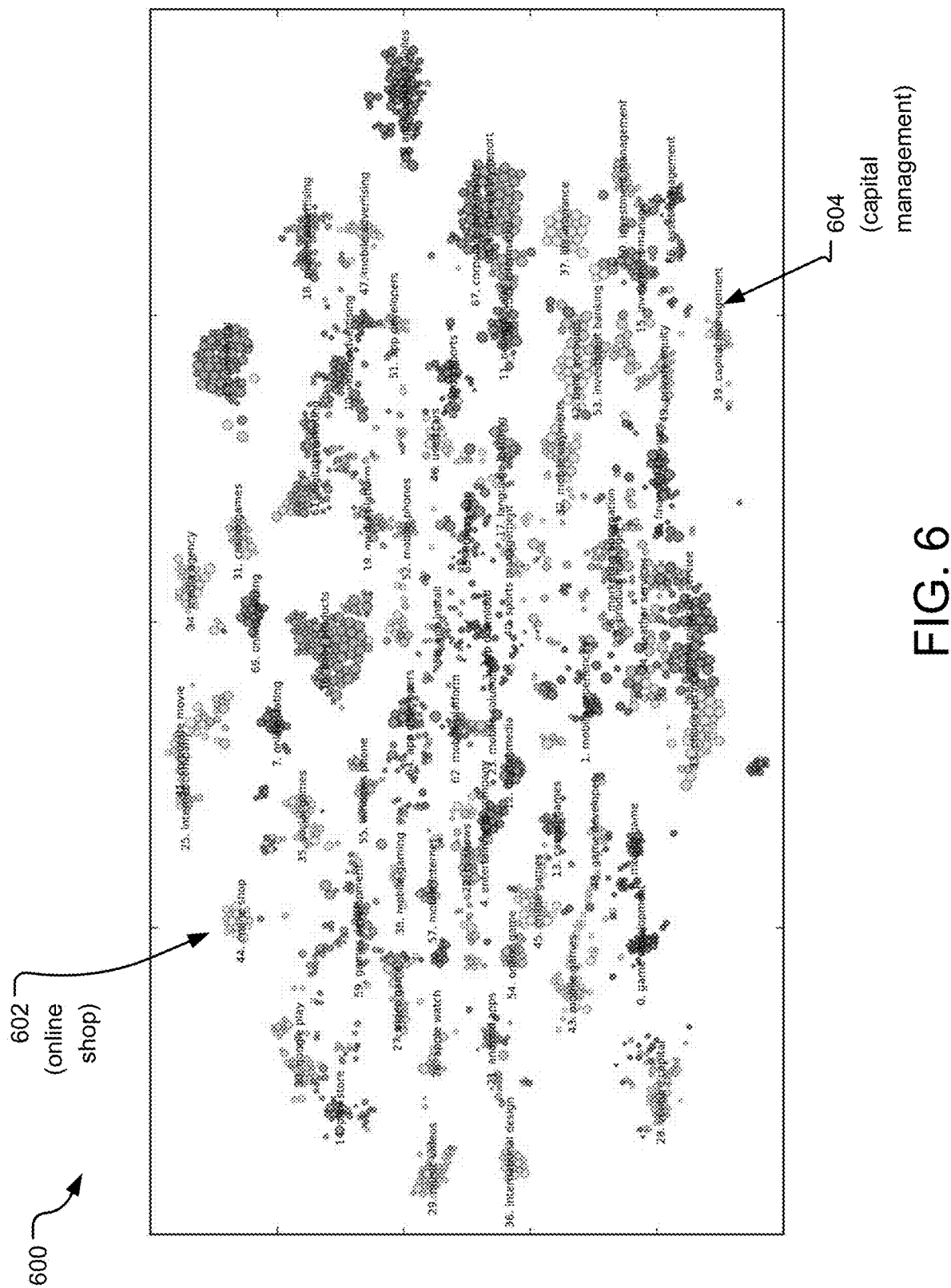
FIG. 6 illustrates example clusters of companies related to each other.

An operation 122 provides cluster visualization with business tags, such as the one illustrated below in FIGS. 6 and 7. The outputs of the visualization technique are 2- or 3-dimensional position coordinates of each entity to be visualized. However, these positions are computed without consideration of the sizes of the points to be visualized, i.e. only the point centers are considered. This may lead to, for example, overlapped circular points in the final visualization as node sizes are subsequently applied to try to convey additional information about each entity. This is not ideal from a user experience or aesthetic perspective, and can also obfuscate information if some points become hidden behind others.

The disclosed technology provides a technique to address this issue, by post-processing the positions according to a set of desired node sizes for the entities. In one implementation, the non-overlap problem formulation for n points may be given by:

$$\text{minimize} \sum_{i=1}^{n} \|x_i - p_i\|_2$$

$$\text{subject to } \|x_i - x_j\|_2 \geq r_i + r_j \text{ for } i > j$$

where $x_i$ is the final layout position vector for point i to be optimized, $p_i$ is the original position vector of point i, and $r_i$ is the desired radius of point i in the final visualization. Conceptually, the constraints are to ensure that no two circular points are overlapped, while the system tries to minimize the total movement of points away from their original positions.

The problem with the above formulation is that the constraints are not convex, thus it is not efficiently solvable. Therefore, a convex restriction is applied by modifying the constraints to ensure that any two points, in 2 dimensions for example, must be separated by a region defined by two parallel lines, both perpendicular to a directional constraint unit vector pointing in the direction from the original positions of point j to point i, whose width is at least $r_i+r_j$. This results in a smaller feasible set, leading to slightly suboptimal solutions to the above problem formulation, but the optimization problem becomes convex and can be efficiently solved as a Quadratic Program using, e.g. interior point methods or other standard convex solvers. To get closer to the optimal solution of the original problem, multiple iterations of this convex optimization are run by using the solutions $x_i$ of the previous run to set the directional constraint unit vector for the next run.

To further optimize the computational efficiency, a large number of the constraints can be removed without much consequence because points that are originally far apart from each other most likely will not violate the non-overlap constraint even after applying node sizes. To this end, an implementation considers constraints only between each point and its k nearest neighbors where k is much smaller than the number of points.

FIG. 2 illustrates various operations 200 for application of the described technology in visualization of the clusters. Specifically, operations 202 to 216 are substantially similar to the operations 102-112. An operation 220 allows searching companies based on relevant business tags or keywords. The operations 220 and 222 together provide ability to look up companies by keywords and keywords by company. Thus, a user may input a keyword, such as "shoes" in a user interface and get a list of companies that are related to shoes. In one implementation, the list of companies is ranked as their relevance to the keyword "shoes." Another operation 222 allows looking up business tag based on companies. Alternatively, a user may input a keyword, such as "Shoe Company A" in a user interface and get a list of keywords that are related to Shoe Company A. In one implementation, the list of keywords is ranked as their relevance to the "Shoe Company A."

Figure 5:
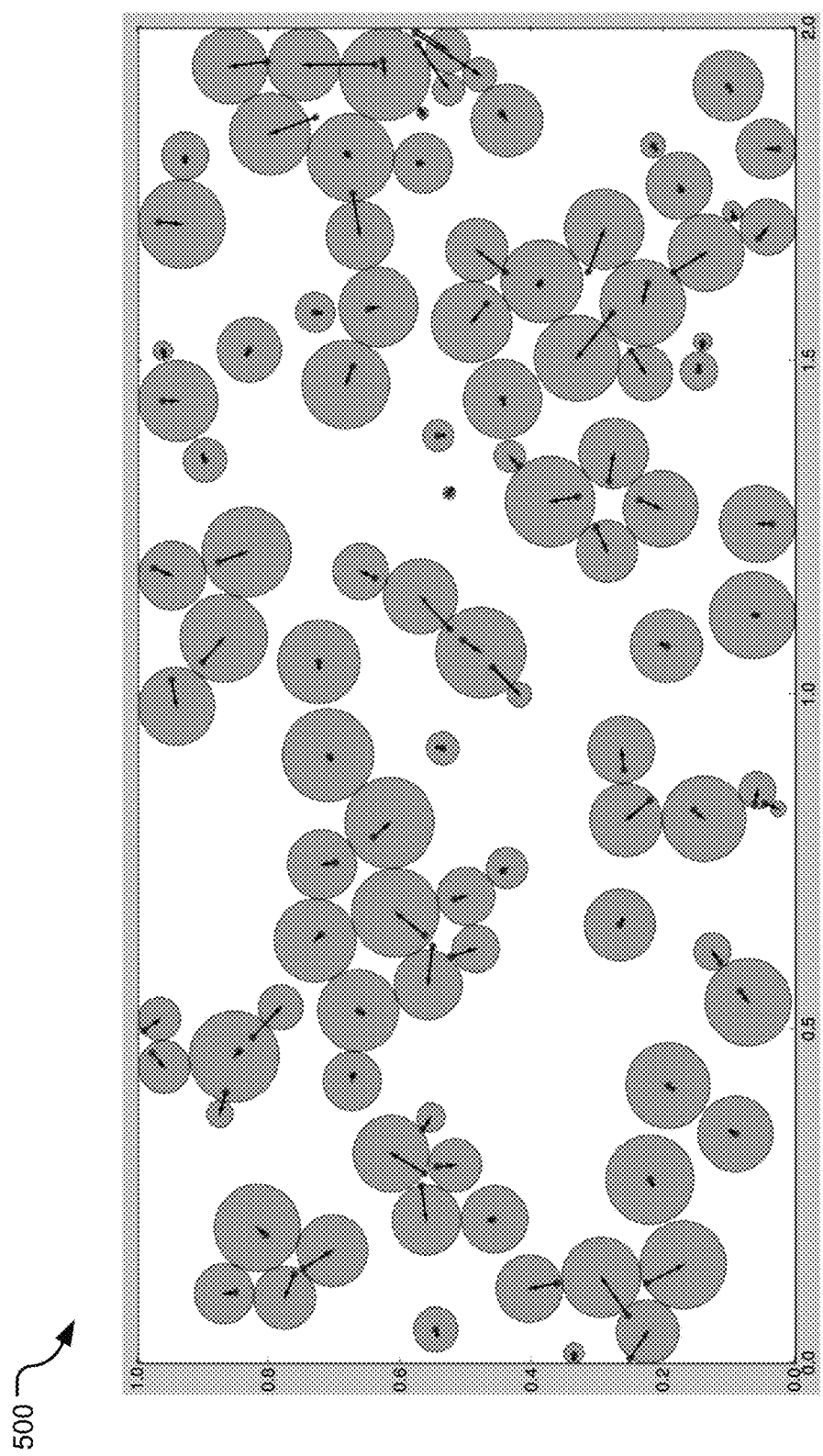
FIG. 5 illustrates example accomplishment of a non-overlap algorithm disclosed herein.

An example illustration of what the non-overlap algorithm accomplishes is shown in FIG. 5. The original positions are labeled by dots at the flat end of the arrows, and the final positions are indicated by the pointed end of the arrows. Box constraints $x_{min} \leq x_i \leq x_{max}$ were added in this example to also bound the circular points within a rectangular region.

In one product application, the customers or prospects of a client are analyzed by clustering them based on our semantic representations, either in the keyword space or the more general topic space. These clusters each consist of companies that are similar in business offerings to each other, and human understandable business tags can be extracted using our cluster tagging and relevance scoring technique. In effect, the clusters can be considered to be micro-segments on which marketers can craft specialized messages and content which resonate well with the personas of the companies in each of the micro-segments, leading to improved conversion rates.

In a related product application, a visualization of the clusters can be shown along with the business tags describing each cluster, to use as an intuitive user interface for clients to get an overview of their customers or prospects, see FIGS. 6 and 7 below. For example, FIG. 6 illustrates a cluster of companies related to online shop 602, a cluster of companies related to capital management 604, etc. Additional valuable insights are provided via different marker sizes, colors, or transparency values of the plot markers. In one example, the plot markers are sized according to contract size, so that our client can quickly see which micro-segments are most valuable to target and pursue. FIGS. 6 and 7 illustrate example visualizations exhibiting the non-overlap layout, clustering, and cluster tagging. In another example, the visualization is animated according to when each opportunity or deal came to exist, allowing our client to find emerging customer segments or see how existing micro-segments evolved over time. Finally, the visualization can also be used as a user interface for our clients to select and create audience segments within our platform, e.g. using a lasso-like tool.

Another product application provides a search engine for companies based on the most relevant business tags that are extracted. This allows marketers and sales teams to quickly search through tens of millions of business for specific target segments or companies that may have similar needs. For example, assume we have a client who is a hard drive manufacturer and they have several exemplary customers that specialize in video surveillance. Video surveillance companies typically have a need for large amounts of hard drive storage to archive large video files. With the search engine, the client can easily find new "video surveillance" businesses that were previously unknown to them, and reach out in a highly personalized way with relevant and successful case studies of their exemplary customers.

In a synergistic application on this platform, the search engine results are ranked by their fit scores according to a client's own trained customer model. In one implementation, the keyword search is tailored for searching businesses because the keywords are extracted from product pages and business descriptions, using a specialized relevance algorithm, therefore yielding much more accurate search results. By coupling with fit scores, the search engine results are both accurate with respect to the keyword query and simultaneously relevant to the client's specific business.

Figure 8:
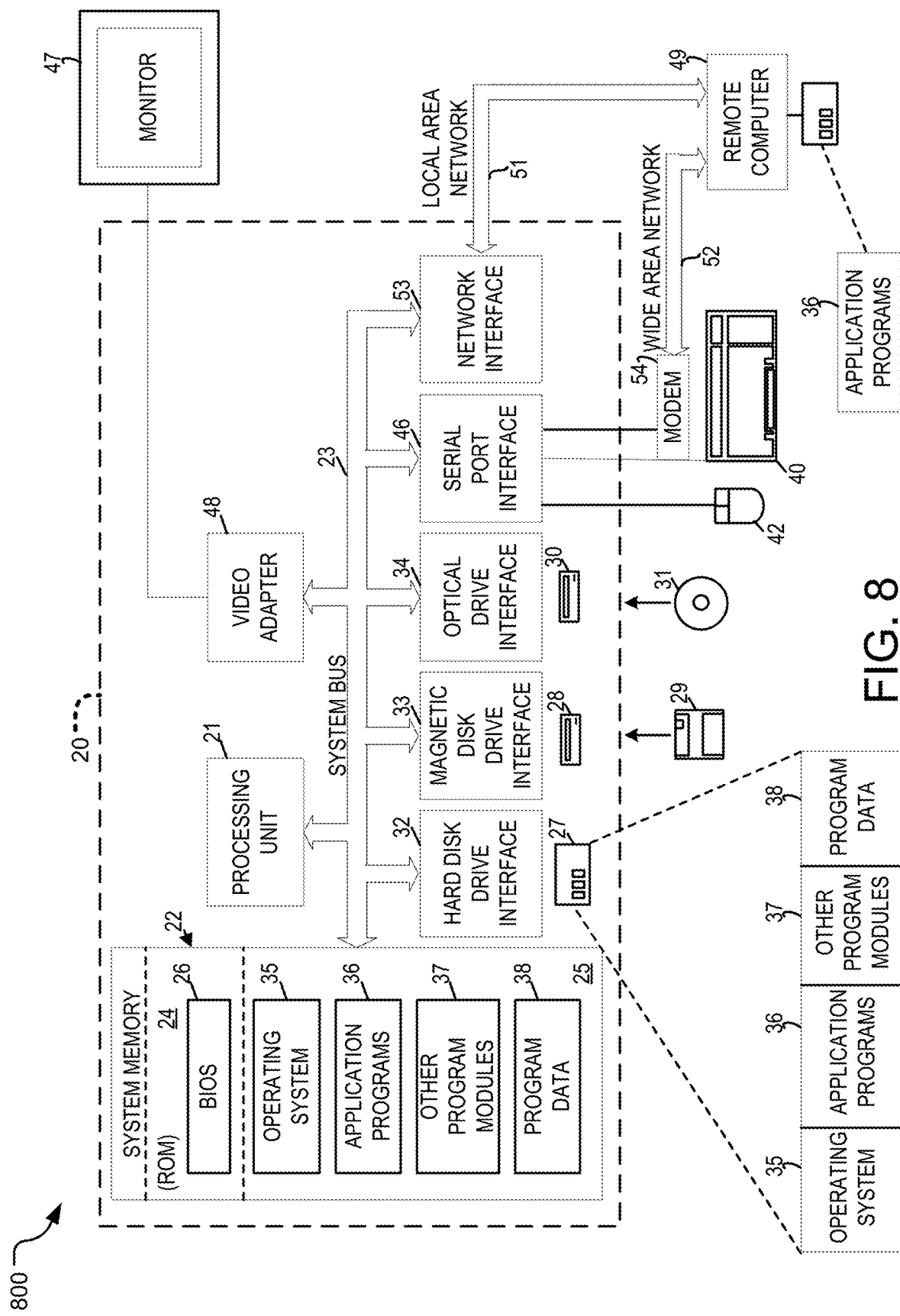
FIG. 8 illustrates an example system that may be useful in implementing the described predictive analytics technology disclosed herein.

FIG. 8 illustrates an example system that may be useful in implementing the described predictive analytics technology. The example hardware and operating environment of FIG. 8 for implementing the described technology includes a computing device, such as general-purpose computing device in the form of a gaming console or computer 20, a mobile telephone, a personal data assistant (PDA), a set top box, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random-access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Figure 9:
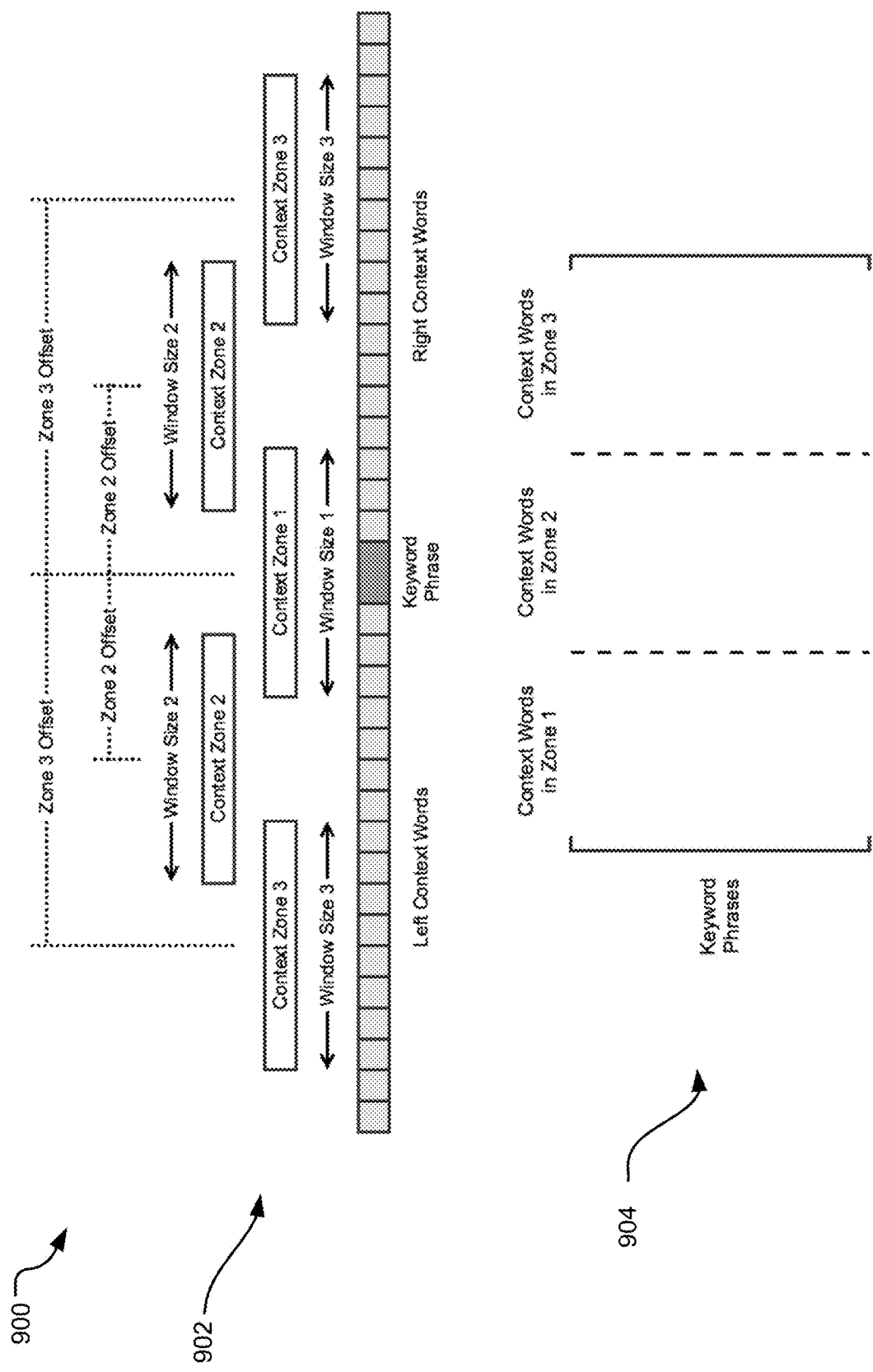
FIG. 9 illustrates example diagrams describing determining similarity of keywords.

FIG. 9 illustrates diagrams describing determining similarity of keywords. To compute how similar any two keyword phrases are to each other, the system disclosed herein generates a vector representation for each keyword phrase from which it then computes various distance or similarity metrics between pair of vectors. Example metrics include, but are not limited to, cosine distance or Euclidean distance. This is loosely similar to the approach used herein to compute similarity between companies, in which companies are mapped into vectors and then similarities are computed using a distance metric in the vector space.

One implementation disclosed herein uses factorization, with dimensionality reduction, of the positive point-wise mutual information (PPMI) matrix of keyword phrase to "context" word co-occurrences. Context words are words that appear around the keyword phrases in natural language sentences, documents, or conversations. The reasoning being that two keyword phrases are similar if they have similar word contexts. To further capture and distinguish between longer distance versus shorter distance contextual semantics, the context words can be segregated by zones or regions of distance away from the central keyword phrase. A diagram illustrating 3 zones is illustrated by 902.

Subsequently, the system disclosed herein parameterizes the context zones by the window size, which defines how many word positions fall into the zone, and by the zone offset, which defines how many positions to shift the zone away from the central keyword phrase. In the example illustrated by 902, symmetric zones to the left and right of the keyword phrase are treated together but in other implementations, zones to the left versus to the right of the keyword phrase may be tracked separately as well.

Subsequently, the system disclosed herein forms the co-occurrence matrix of keyword phrase to context words by counting the occurrences of each pair of (w, c), where w is the keyword phrase and c is a context word within a specific zone. In some implementations, the contribution of a co-occurring pair may be weighted by the position within the zone or distance from the central keyword phrase. The co-occurrence values are aggregated over a large corpus of natural language text documents, such as news articles, crawled websites, and Wikipedia articles. The aggregated values are stored in a keyword-context matrix are illustrated at 904 for the example of three context zones.

The raw co-occurrence values are not a good measure of key-phrase to context word association because certain words and phrases naturally occur more frequently than others. Instead, an implementation disclosed herein uses point-wise mutual information to measure how informative a context word is about a target key-phrase. For each cell in the matrix the system computes the point-wise mutual information as:

$$pmi(w, c) = \log \frac{p(w, c)}{p(w)p(c)}$$

where p(w, c) is the probability of the co-occurring keyword phrase and context word, p(w) is the probability of observing the keyword phrase, and p(c) is the probability of observing the context word. Larger positive PMI values mean that the words co-occur more than if they were independent. In practice, negative values are unreliable when dealing with extremely small probabilities and require large amounts of text and evidence, therefore in some implementations, only positive PMI values are considered, and negative values are replaced with 0 using:

$$ppmi(w,c)=\max(0,pmi(w,c)).$$

In some implementations, the p(c) term is also modified to give rare context words higher probabilities because very rare words can skew PMI to large values, resulting in worse performance in the downstream semantic similarity tasks. One example modification is:

$$p'(c) = \frac{\text{count}(c)^\alpha}{\sum_c \text{count}(c)^\alpha}$$

where the context counts are scaled to a power a that is between 0 and 1, which has the effect of increasing the probability of rare context words. Another possible modification is add-k smoothing, which modifies each count(c) by the addition of a positive value k, thus raising the minimum count of rare words.

Once the matrix of PPMI values is formed, it is factorized, e.g., using Singular Value Decomposition, into a key-phrase-to-latent topic matrix multiplying a latent topic-to-context matrix. The rows of the key-phrase-to-latent topic matrix are the desired key-phrase vectors from which the system computes similarities between every pair of keyword phrases.

The above paragraphs disclose only one technique to produce key-phrase vectors from which similarities may be computed. Other word embedding techniques include CBOW Word2Vec, Skip-gram Word2Vec, or GloVe, though they may be used on single words rather than keyword phrases.

Using the similarity measure between all key-phrases, an implementation disclosed herein produces a list of most similar key-phrases for every key-phrase. This additional dataset synergizes well with other offerings on the system disclosed herein, particularly enhancing the ability for users to search for companies using key-phrases which we have algorithmically tagged companies with (described in other sections of this patent). Using the outputs of the keyword similarity computation, the system disclosed herein suggests related and similar keywords for the user to add to their query. For example, when a user searches for "artificial intelligence" companies, we can automatically suggest additional queries on "machine learning", "deep learning", "computer vision", and "ai". This greatly reduces the burden on users to recall or think of all possible variants of similar key-phrase queries, and may even introduce new concepts or terms that the user was not aware of.

Another application of the similarity measure between key-phrases is the enhancement of the algorithm described above for automatically tagging companies with keywords that describe the company's business. FIG. 4 above showed how topics that exist within a document are used to boost the relevance score of individual keywords that are related to that topic. Using the computed similarities between keywords, each keyword can boost another keyword's relevance score by considering how similar they are to each other. Specifically, a clique of related keywords may boost each other's relevance score because the fact that they co-occur within a document suggests that there is a related topic that the document is focused on.

Figure 10:
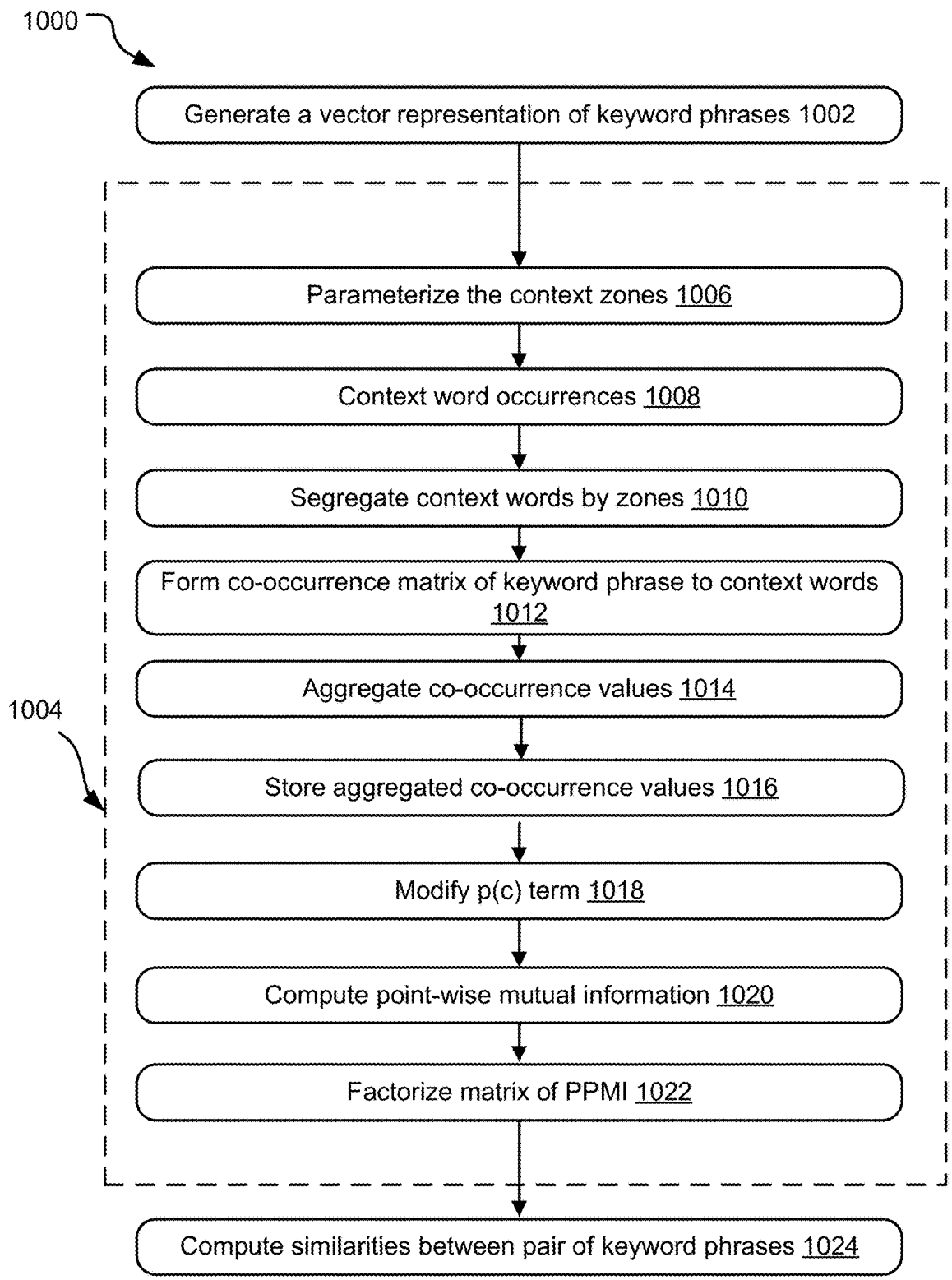
FIG. 10 illustrates example operations for determining similarity of keywords.

FIG. 10 illustrates a flowchart with operations 1000 for determining similarity of keywords. An operation 1002 generates a vector representation for each keyword phrase. One or more operations for generating the vector representation as per 1002 are illustrated by the block 1004 of operations. An operation 1006 parameterizes the context zones by window size, which defines how many word positions fall into the zone, and by the zone offset, which defines how many positions to shift the zone away from the central keyword phrase. Operations 1008 and 1010 count the context word occurrences in the desired context zones around keyword phrases.

Subsequently, an operation 1012 forms co-occurrence matrix of keyword phrase to context words by counting the occurrences of each pair of (w, c), where w is the keyword phrase and c is a context word within a specific zone. An operation 1014 aggregates co-occurrence values over a large corpus of natural language text documents, such as news articles, crawled websites, and Wikipedia articles. The aggregated values are stored in a keyword-context matrix at an operation 1016 as illustrated at 904.

An operation 1018 modifies the p(c) term to give rare context words higher probabilities because very rare words can skew PMI to large values, resulting in worse performance in the downstream semantic similarity tasks. Subsequently, an operation 1020 computes point-wise mutual information pmi (w, c). In some implementations, only the positive PMI values pmmi are considered, and negative values are replaced with 0. Subsequently, an operation 1022 factorizes the matrix of PPMI using Singular Value Decomposition, into a key-phrase-to-latent topic matrix multiplying a latent topic-to-context matrix. An operation 1024 computes similarities between pair of keyword phrases using the rows of the key-phrase-to-latent topic matrix.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general-purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Hash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer-implemented method, wherein one or more computing devices comprising storage and a processor are programmed to perform steps comprising:

crawling a plurality of web pages to collect textual information about a plurality of companies;

generating other textual descriptions based on data from secondary sources associated with each of the plurality of companies;

combining the textual information with the other textual descriptions to form a corpus of documents that describes the plurality of companies;

extracting keyword phrases and topics from the corpus of documents, the topics being associated with the extracted keyword phrases or a portion of the extracted keyword phrases;

generating a count for the extracted keyword phrases within the corpus of documents;

determining document frequencies (DF) for each extracted keyword phrase across the corpus of documents;

applying a term-frequency (TF)-inverse-document-frequency (IDF) (TF-IDF) transformation to each of the extracted keyword phrases to generate a respective plurality of TF-IDF vectors;

determining a strength of each topic based on a number of extracted keyword phrases associated with that respective topic;

determining an edge weight based on a linkage of the topic with an associated extracted keyword phrase;

generating relevance scores relating each extracted keyword phrase to the respective company based on a strength of each of the extracted keyword phrases, the strength of each topic, and the edge weight for each topic, the strength of each of the extracted keyword phrases being equal to a TF-IDF vector associated with the extracted keyword phrase;

applying a representation learning technique to the plurality of TF-IDF vectors and the relevance scores to generalize each respective company into at least one of a plurality of topic spaces;

segmenting the plurality of companies into clusters by applying a clustering technique to the extracted keyword phrases for each respective company or to the plurality of topic spaces; and providing visualization of the clusters of companies with respective business tags.

2. The computer-implemented method of claim 1, further comprising generating similarity between two or more of the extracted keyword phrases by generating a vector representation for each extracted keyword phrase and computing one or more distance metrics between pair of vector representations.

3. The computer-implemented method of claim 2, wherein the distance metrics between the pair of vector representations includes distance between extracted keyword phrases as one of cosine distance and Euclidian distance.

4. The computer-implemented method of claim 1, further comprising generating similarity between two or more of the extracted keyword phrases by determining a positive point-wise mutual information (PPMI) matrix of the two or more of the extracted keyword phrases to context words.

5. The computer-implemented method of claim 4, further comprising segregating the context words by regions of distances away from a central keyword phrase.

6. The computer-implemented method of claim 4, further comprising generating a co-occurrence matrix of extracted keyword phrase to context words by counting the occurrences of each pair of (w, c), where w is the extracted keyword phrase and c is a context word within a specific zone.

7. The computer-implemented method of claim 6, further comprising generating point-wise mutual information (pmi) for each cell in the co-occurrence matrix of extracted keyword phrase to context words as:

$$> m.i.(w, c) = \log \frac{p(w, c)}{p(w)p(c)}$$

8. A physical article of manufacture including one or more tangible computer-readable storage media, encoding computer-executable instructions for executing on a computer system a computer process, the computer process comprising:
  crawling a plurality of web pages to collect textual information about a plurality of companies; generating other textual descriptions based on data from secondary sources associated with each of the plurality of companies; combining the textual information with the other textual descriptions to form a corpus of documents that describes the plurality of companies; extracting keyword phrases and topics from the corpus of documents, the topics being associated with the extracted keyword phrases or a portion of the extracted keyword phrases;
  applying a term-frequency (TF)-inverse-document-frequency (IDF) (TF-IDF) transformation to each of the extracted keyword phrases to generate a respective plurality of TF-IDF vectors; determining a strength of each topic based on a number of extracted keyword phrases associated with that respective topic, determining an edge weight based on a linkage of the topic with an associated extracted keyword phrase, generating relevance scores relating each extracted keyword phrase to the respective company based on a strength of each of the extracted keyword phrases, the strength of each topic, and the edge weight for each topic, the strength of each of the extracted keyword phrases being equal to a TF-IDF vector associated with the extracted keyword phrase;
  applying a representation learning technique to the plurality of TF-IDF vectors and the relevance scores to generalize each respective company into at least one of a plurality of topic spaces; segmenting the plurality of companies into clusters by applying a clustering technique to the extracted keyword phrases for each respective company or to the plurality of topic spaces; and providing visualization of the clusters of companies with respective business tags.

9. The physical article of manufacture of claim 8, wherein the computer process further comprising generating similarity between two or more of the extracted keyword phrases by generating a vector representation for each extracted keyword phrase and computing one or more distance metrics between pair of vector representations.

10. The physical article of manufacture of claim 9, wherein the computer process further comprising determining document frequencies (DF) for each extracted keyword phrase across the corpus of documents.

11. The physical article of manufacture of claim 8, wherein the computer process further comprising generating similarity between two or more of the extracted keyword phrases by determining a positive point-wise mutual information (PPMI) matrix of the two or more of the extracted keyword phrases to context words.

12. The physical article of manufacture of claim 11, wherein the computer process further comprising segregating the context words by regions of distances away from a central keyword phrase.

13. The physical article of manufacture of claim 8, wherein generating the relevance score satisfies the following condition:

$$r_i = w_i \cdot \sum_{j=1}^{k} (e_{ji} \cdot t_j)$$

wherein $r_i$ is the relevance of extracted keyword phrase i, $w_i$ is the strength of extract keyword phrase i, $e_{ji}$ is an edge weight from topic j to extracted keyword phrase i, $t_j$ is the strength of topic j, and k is the number of topics.

14. The physical article of manufacture of claim 9, wherein the clustering technique includes merging the vector representations into a single vector.

15. The physical article of manufacture of claim 14, wherein the merging is performed via an aggregating function.

16. The computer-implemented method of claim 2, wherein generating the relevance score satisfies the following condition:

$$r_i = w_i \cdot \sum_{j=1}^{k} (e_{ji} \cdot t_j)$$

wherein $r_i$ is the relevance of extracted keyword phrase i, $w_i$ is the strength of extract keyword phrase i, $e_{ji}$ is an edge weight from topic j to extracted keyword phrase i, $t_j$ is the strength of topic j, and k is the number of topics.

17. The computer-implemented method of claim 16, wherein the clustering technique includes merging the vector representations into a single vector.

18. The computer-implemented method of claim 17, wherein the merging is performed via an aggregating function.

19. The computer-implemented method of claim 1, wherein the strength of each of the extracted keyword or the strengths of the topics are generated by a strength function, including Latent Semantic Analysis, Latent Dirichlet Allocation, Hierarchical Dirichlet Processes, Non-negative Matrix Factorization, or a combination thereof.

20. The computer-implemented method of claim 1, wherein the strength of each topic satisfies the equation $$1+\log(\text{degree})$$

where degree is a number of unique extract keyword phrases that contain a word that stems to the topic.

* * * * *

UNITED STATES PATENT AND TRADEMARK OFFICE
CERTIFICATE OF CORRECTION

PATENT NO. : 11,093,557 B2
APPLICATION NO. : 15/689942
DATED : August 17, 2021
INVENTOR(S) : Hua Gao et al.

It is certified that error appears in the above-identified patent and that said Letters Patent is hereby corrected as shown below:

In the Claims

Claim 8 should read as follows:
8. A physical article of manufacture including one or more tangible computer-readable storage media, encoding computer-executable instructions for executing on a computer system a computer process, the computer process comprising:
    crawling a plurality of web pages to collect textual information about a plurality of companies;
    generating other textual descriptions based on data from secondary sources associated with each of the plurality of companies;
    combining the textual information with the other textual descriptions to form a corpus of documents that describes the plurality of companies;
    extracting keyword phrases and topics from the corpus of documents, the topics being associated with the extracted keyword phrases or a portion of the extracted keyword phrases;
    applying a term-frequency (TF) - inverse-document-frequency (IDF) (TF-IDF) transformation to each of the extracted keyword phrases to generate a respective plurality of TF-IDF vectors;
    determining a strength of each topic based on a number of extracted keyword phrases associated with that respective topic;
    determining an edge weight based on a linkage of the topic with an associated extracted keyword phrase;
    generating relevance scores relating each extracted keyword phrase to the respective company based on a strength of each of the extracted keyword phrases, the strength of each topic, and the edge weight for each topic, the strength of each of the extracted keyword phrases being equal to a TF-IDF vector associated with the extracted keyword phrase;
    applying a representation learning technique to the plurality of TF-IDF vectors and the relevance scores to generalize each respective company into at least one of a plurality of topic spaces;
    segmenting the plurality of companies into clusters by applying a clustering technique to the extracted keyword phrases for each respective company or to the plurality of topic spaces; and
    providing visualization of the clusters of companies with respective business tags.

Signed and Sealed this
Fifth Day of April, 2022

Drew Hirshfeld
*Performing the Functions and Duties of the
Under Secretary of Commerce for Intellectual Property and
Director of the United States Patent and Trademark Office*